July 6, 1926.
C. A. LYFORD
METHOD OF SUBLIMATION
Filed April 2, 1920
1,591,715
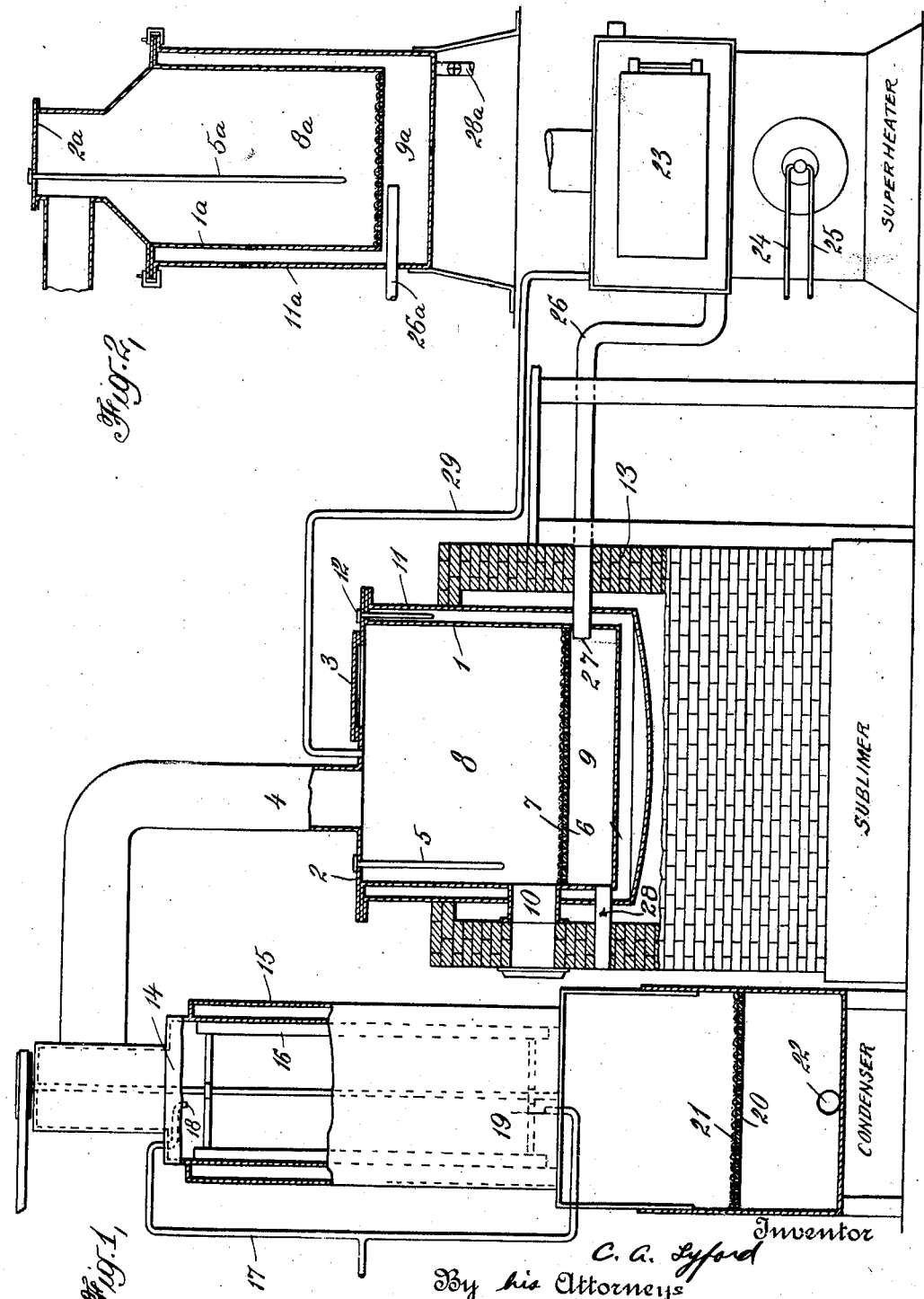
Inventor
C. A. Lyford
By his Attorneys
Pennie Davis Marvin & Edmonds Patented July 6, 1926.

1,591,715

UNITED STATES PATENT OFFICE.

CHAUNCEY A. LYFORD, OF EAST AURORA, NEW YORK, ASSIGNOR TO NATIONAL ANILINE & CHEMICAL CO., INC., OF NEW YORK, N. Y., A CORPORATION OF NEW YORK.

METHOD OF SUBLIMATION.

Application filed April 2, 1920. Serial No. 370,801.

This invention relates to an improved method of purifying benzanthrone by sublimation, and more particularly to the purification of crude benzanthrone for the purpose of separating it from the non-sublimable impurities produced simultaneously therewith in the production of benzanthrone from anthraquinone or anthranol.

In the production of benzanthrone, by the condensation of anthraquinone or anthranol with glycerine, there are simultaneously produced varying amounts of impurities from which it is necessary to separate the benzanthrone in order to obtain it in a purified or partially purified state. The impure crude benzanthrone, admixed with the impurities, is, after drying, a material of a brittle character which is easily reduced to a fine powder when subjected to agitation. Because of its character, this material is not well adapted for treatment by sublimation in apparatus in which the material is agitated during the sublimation, since the fine dust of the material produced by the agitation is carried over to a greater or less extent with the sublimate so that the sublimate is contaminated by impurities.

In the ordinary forms of sublimers designed for work at high temperatures difficulty is also encountered because of local overheating of the material where it comes in contact with the walls of the container, if the container walls are heated to a sufficiently high temperature to bring about the sublimation. Such overheating may result in charring or gumming of the material near the heated walls, and uneven heating of the charge as a whole. The provision of agitators reduces this difficulty of overheating or uneven heating, although this difficulty may nevertheless be encountered to a greater or less extent even when an agitator is provided. The employment of an agitator, however, has the disadvantage above referred to that it pulverizes the material so that the fine dust of the crude material is carried over as an impurity with the sublimate.

The present invention is based upon the discovery that crude benzanthrone can be purified from its non-sublimable impurities in a simple and advantageous manner, and without the difficulties arising from local overheating or from mechanical agitation of the mass undergoing sublimation, by placing the crude benzanthrone in a suitable container or receptacle upon a perforated bottom and introducing superheated steam or other heated gas or vapor beneath the perforated bottom so that it is caused to pass up therethrough and through the material supported thereon. The sublimed benzanthrone and sublimable impurities, together with the transporting medium, are conveyed from the sublimation receptacle to a suitable condenser where the sublimate is separated in a solid state.

In carrying out the sublimation process of the present invention, the crude benzanthrone will be progressively heated by the superheated steam passing therethrough and will be gradually brought to the temperature of sublimation. The crude material will first be heated to a temperature of about 100° C. and may remain at this temperature for some time, even with the use of highly superheated steam, until any moisture contained in the material has been removed and until such other reactions, such as decomposition of sulfonated compounds and evolution of sulfur dioxide, which takes place at this temperature, have taken place. Sublimation commences as soon as the material is superheated above 100° and proceeds with increasing speed as the temperature increases until the optimum temperature is reached. When the optimum temperature has been attained, this temperature is continued until the sublimation is substantially completed, although this temperature can with advantage be somewhat increased at the end of the operation to complete the sublimation. At any given temperature at which the sublimation takes place, and within certain limits of speed with which the superheated steam is admitted, the sublimation goes on faster with the use of a greater amount of steam. It will not generally be advisable to carry the temperature higher than about 260° C., although the superheated steam employed may itself have a much higher temperature. As the temperature approaches the desired temperature of operation, it may be controlled either by increasing or decreasing the steam supply or by varying the steam temperature. The rate at which the superheated steam is passed through the charge and through the sublimer should be sufficient to permit but little cooling in the upper part of the apparatus, which should be well insulated.

The invention will be further described in connection with the accompanying drawings illustrating apparatus adapted for the practice of the invention. This apparatus is not claimed herein but forms the subject-matter of a separate application, Serial No. 370,802, filed April 2, 1920.

In the accompanying drawings:

Fig. 1 shows one form of sublimation apparatus in elevation and with parts in section; and Fig. 2 is a vertical sectional view of a modified form of apparatus.

In the apparatus of Fig. 1 the receptacle or container 1 is provided with a suitable cover 2 having a charging manhole 3 therein and having an outlet conduit 4 for the sublimate, this conduit leading to the condenser 14. The receptacle or container 1 has a perforated bottom spaced away from the bottom of the container itself and suitably supported (by means not shown). This perforated bottom is made up of a perforated sheet metal plate 6 having a screen 7 supported thereby and upon which the charge of crude benzanthrone to be sublimed is supported. The screen 7 prevents smaller particles from falling through into the chamber 9 and insures a more uniform distribution of the heating and transporting medium passing upwardly therethrough. The perforated or false bottom divides the vessel or receptacle 1 into a larger upper chamber 8 and a smaller lower chamber 9. The chamber 8 has a side opening 10 for the purpose of removing the exhausted material at the end of the operation.

The container 1 is surrounded by a heating jacket 11 intended for oil or other suitable medium. The oil jacket is heated and maintained at the desired temperature in any suitable manner, as by direct firing in the furnace 13. Thermometer wells 5 and 12 are suitably arranged in the chamber 8 and in the oil jacket. It will be evident that the oil used in the heating jacket should have a high flash point. The temperature of the oil or other heating medium in the jacket should be maintained only at about that point which will compensate for the possible heat losses of the superheated steam or other transporting medium passing through the apparatus. All the exposed metal parts of the apparatus should be covered with magnesia packing or other insulating covering (not shown) to prevent condensation of the sublimate.

Where superheated steam is supplied as the transporting medium it is superheated to the proper temperature in the superheater 23 which may be of any suitable construction, and which is shown as an oil-fired superheater having oil and air supply pipes 24 and 25. The superheated steam, superheated to the proper temperature, is conveyed from the superheater through the pipe 26 and discharges at 27 into the lower chamber 9 below the false bottom. From this chamber it passes up through the perforated bottom in a uniform manner and then passes up through the charge of crude benzanthrone, serving to heat the material in a uniform manner and to the proper temperature. The sublimed benzanthrone is carried over with the superheated steam, through the pipe 4, to the condenser. The pipe 29 from the superheater to the top of the chamber 8 permits an excess of superheated steam to be introduced to assist in sweeping the vapors from the chamber to the condenser.

The condenser illustrated is provided with a water jacket 15 and with scrapers 16 for keeping the inside cooling surfaces free from any benzanthrone that condenses thereon, thereby promoting the cooling effect of the water jacket. The condenser is also provided with spray nozzles 18 and 19, one for spraying water downwardly at the top and the other for spraying water upwardly from the bottom. Water is supplied through the pipe 17. The benzanthrone and the water condensed in the condenser are passed to a filter for the separation of the benzanthrone from the water. As illustrated, this filter is in the form of a perforated plate 20 having a canvas layer 21 thereon. The benzanthrone is collected on the filter while the water is drawn off through the pipe 22 to a suction pump (not shown).

In the operation of the apparatus, the charge of crude benzanthrone, for example, the dry crude benzanthrone press-cake in lumps about the size of English walnuts, is charged into the compartment 8 through the manhole 3, the manhole cover is secured in place, the oil jacket is heated, for example, to a temperature of about 285° C., and the superheated steam is introduced through the pipe 27 into the lower chamber 9 from which it passes upwardly through the false bottom and through the charge supported thereby. In starting the operation, the oil burners under the oil jacket and the superheater, can be simultaneously started and the temperature of the oil jacket and of the steam gradually increased to the desired temperature, as indicated by thermometers placed in the thermometer wells 5 and 12. The temperature of the steam is quickly raised by the superheater to a suitable temperature, for example, of about 325° C., where it can be maintained throughout the operation. Until the whole apparatus comes to a temperature of 100° C., at which steam is no longer condensed within the apparatus, the bleeder or draw-off pipe 28 is kept open so that water may drain off. When the steam no longer condenses this opening is closed. The supply of steam passing through the apparatus is in part determined by the capacity of the condensing apparatus and is adjusted to that capacity. In the ordinary operation of the apparatus, a considerable time may be required to bring the charge to 100° or thereabove, after which the temperature mounts more rapidly until it reaches the temperature at which the main sublimation is to take place. With the gradual heating of the apparatus, a period of a few hours may be required for attaining this temperature, for example, a temperature of about 225° C., or a maximum temperature of about 250° C. When the sublimation is completed, as indicated by the fact that no more collects in the condenser and receiver, the heating of the oil jacket and of the steam is discontinued, and a small supply of ordinary steam, not superheated, is kept going through the apparatus for the purpose of keeping air away from the unsublimed residue until the temperature has fallen to about 125° C. This maintenance of the steam supply prevents inflow of air to the apparatus and setting fire to the residue.

The crude benzanthrone charged into the apparatus is advantageously the dried press-cake in the form of lumps of a suitable size, inasmuch as the dried material gives a porous mass well adapted for the sublimation, while the undried press-cake tends to give a non-porous mass. The current of superheated steam is not allowed to rush through the apparatus but is regulated so that an even, gentle flow is obtained which prevents mechanical losses by the carrying over of crude material with the sublimate. The residue remaining in the apparatus at the end of the sublimation is made up of the unsublimable impurities of the crude benzanthrone. This residue is relatively bulky, and varies in amount, depending upon the particular method by which the crude benzanthrone was produced. This residue is withdrawn from the apparatus through the opening 10.

The sublimate, made up mainly of the sublimed benzanthrone, together with any sublimable impurities that accompany it, and together with the superheated steam, pass through the pipe 4 to the condenser where condensation is effected, and where the sublimate is collected on the filter 21. The condensation can be effected either by means of the water jacket 15 or by means of the spray introduced through the spray nozzles 18 and 19, or by the combined use of the water jacket and the spray.

The method of effecting the condensation of the sublimate determines its physical state. If the sublimed benzanthrone is condensed upon the cold surface of the water jacket, it is in a harder, caky condition requiring subsequent grinding. It is more advantageous to bring about the condensation by means of the water spray, inasmuch as the benzanthrone can thus be obtained in a fine, soft condition. The warmer the condensing chamber, the softer and the more desirable for certain purposes is the physical condition of the material. The production of a product of this character is effected by slow condensation in a warm chamber of sufficient size. When the sublimate is condensed with the water spray, and the product is separated by suction filtration, such soluble product or products as may be admixed with it are to a greater or less extent washed away with resulting improvement in the purity of the sublimed product; while the product condensed by cooling without the water spray, and dried without washing, has a more variable melting point. It is accordingly of advantage to bring about the condensation with the water spray so that the steam and benzanthrone are condensed and admixed with the added water and the benzanthrone obtained in a finely divided state and washed with the water before it is finally separated.

While other suitable gases or vapors than superheated steam can be used for carrying out the sublimation when heated to the requisite temperature, and provided proper precautions are taken, nevertheless the use of superheated steam is particularly advantageous in the carrying out of the process as well as in the condensation of the sublimate, inasmuch as the condensation of the admixed steam and benzanthrone vapors gives a less voluminous and fluffy and more dense fine powder.

Where the crude material treated contains anthraquinone admixed with the benzanthrone and other impurities, the anthraquinone will usually be sublimed with the benzanthrone and will be admixed with the sublimate as an impurity, unless precaution is taken to effect the fractional sublimation and the separation of the anthraquinone, to a greater or less extent, from the benzanthrone, during the sublimation. Where unchanged anthraquinone is thus present in the crude benzanthrone, a composite product may be obtained containing varying amounts of the anthroquinone admixed with the benzanthrone. The benzanthrone produced according to the present invention, where it still contains admixed sublimable impurities, such as anthraquinone, may be subjected to further purification to free it from such impurities. The sublimed benzanthrone can, however, be used directly without purification, where the impurities are present in unobjectionable amount or where they do not interfere with the treatment to which the benzanthrone is to be subsequently subjected, or the use to which it is to be put.

Instead of purifying crude benzanthrone and separating the benzanthrone from the non-volatile matrix of impurities with which it is admixed, the process of the present invention is also applicable to the treatment of a purified benzanthrone for the purpose of changing its physical condition.

In the apparatus of Fig. 2 the corresponding parts are indicated by the same reference numerals with the suffix "a" appended thereto. In the construction illustrated in this figure, however, the oil jacket is omitted and a steam jacket is provided adapted to be heated by the same steam which is used in carrying out the sublimation operation. The apparatus comprises the receptacle 1ª having a perforated bottom for containing the charge of material to be sublimed, and this receptacle is surrounded by an outer receptacle 11ª which provides an annular steam jacket and a bottom compartment 9ª for the superheated steam introduced through the pipe 26ª. The apparatus is provided with suitable insulating means such as a magnesia covering (not shown).

In the operation of this apparatus, the cover is removed, the receptable 1ª, which can be removed from the outer vessel 11ª, is charged with the material to be sublimed, the cover is replaced, and the operation is then carried on in a manner similar to that above described, by the introduction of the superheated steam through the pipe 26ª. This superheated steam has the double function of supplying the heat for the heating jacket and the steam for the sublimation, so that the receptacle 1ª is surrounded by steam at substantially the same temperature as that which is passing through it for effecting the sublimation. Proper regulation of the steam temperature thus enables the entire sublimation operation to be properly regulated in temperature.

From the above description it will be seen that the sublimation of the benzanthrone is effected without local overheating or uneven heating of the charge and without mechanical agitation thereof. As a result the production of fine dust is avoided and the carrying over of fine dust with the steam and sublimate is likewise avoided. The only agitation to which the charge is subjected is that incident to the passage of the steam upwardly therethrough, but this will ordinarily be so slight that it will be entirely unobjectionable and may even be desirable in promoting the uniformity of distribution of the steam through the material.

The improved method of the present invention is especially adapted for treating such materials as benzanthrone, etc., because the material is sublimed without agitation, so that "dusting" is eliminated, as well as local overheating. The material is supported out of contact with the hottest portion of the container or receptacle, namely, the bottom, and in such position that the heating and transporting agent may have access to every part thereof. That is, such agent must pass through the material, and the material is so supported that it is permeable thereto.

I claim:

1. The method of effecting the sublimation of benzanthrone, which comprises heating the benzanthrone to the point of sublimation by passing through the material a suitable gaseous heating and transporting agent, heated to a temperature higher than that at which the benzanthrone sublimes, and carrying away the sublimate by such heating and transporting agent.

2. The method of effecting the sublimation of benzanthrone, which comprises heating the benzanthrone to the point of sublimation by passing through the material a suitable gaseous heating and transporting agent, heated to a temperature higher than that at which the benzanthrone sublimes, and carrying away the sublimate by such heating and transporting agent, and supporting the benzanthrone in such manner that it will be permeable throughout its mass to the agent.

3. The method of effecting the sublimation of benzanthrone, which comprises heating the benzanthrone to the point of sublimation by passing through the material a suitable gaseous heating and transporting agent, heated to a temperature higher than that at which the benzanthrone sublimes, and carrying away the sublimate by such heating and transporting agent, supporting the benzanthrone in such manner that it will be permeable throughout its mass to the agent, and condensing together the sublimate and the heating agent.

4. The method of effecting the sublimation of benzanthrone, which comprises heating the benzanthrone to the point of sublimation by passing through the material a suitable gaseous heating and transporting agent, heated to a temperature higher than that at which the benzanthrone sublimes, carrying away the sublimate by such heating and transporting agent, supporting the benzanthrone in such manner that it will be permeable throughout its mass to the agent, and condensing together the sublimate and the heating agent by means of a spray of cooling liquid, whereby a finely divided product is obtained.

5. The method of effecting the sublimation of benzanthrone, which comprises passing upwardly through the mass of benzanthrone a current of superheated steam at a temperature of 225° to 250° C., and afterwards condensing the steam and the volatilized benzanthrone.

6. The method of effecting the sublimation of benzanthrone, which comprises subjecting the same to the action of superheated steam heated to a temperature of about 225 to 250° C. passed through the benzanthrone in intimate contact with every part thereof.

7. The method of effecting the sublimation of crude benzanthrone, which comprises charging a body of the dry crude benzanthrone, largely in the form of small lumps, in such manner that a gaseous heating agent may pass upwardly through the benzanthrone, introducing superheated steam upwardly through the charge of material at a temperature appropriate to the sublimation, and condensing the admixed sublimate and steam to give the benzanthrone in a finely divided state.

In testimony whereof I affix my signature.

CHAUNCEY A. LYFORD.